(12) United States Patent
Hori et al.

(10) Patent No.: US 8,110,248 B2
(45) Date of Patent: Feb. 7, 2012

(54) FUEL CELL STRUCTURE AND METHOD OF MANUFACTURING SAME

(75) Inventors: Masaru Hori, Nisshin (JP); Mineo Hiramatsu, Aichi (JP); Hiroyuki Kano, Aichi (JP); Satoshi Yoshida, Toyota (JP); Yukihisa Katayama, Toyota (JP); Toru Sugiyama, Aichi (JP)

(73) Assignees: Masaru Hori, Nishin-shi, Aichi (JP); Mineo Hiramatsu, Aichi-gun, Aichi (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1006 days.

(21) Appl. No.: 11/884,234

(22) PCT Filed: Feb. 14, 2006

(86) PCT No.: PCT/JP2006/302915
§ 371 (c)(1),
(2), (4) Date: Aug. 13, 2007

(87) PCT Pub. No.: WO2006/085698
PCT Pub. Date: Aug. 17, 2006

(65) Prior Publication Data
US 2008/0187814 A1    Aug. 7, 2008

(30) Foreign Application Priority Data
Feb. 14, 2005 (JP) .................. 2005-036288

(51) Int. Cl.
*H01M 4/96*    (2006.01)

(52) U.S. Cl. ............ 427/115; 427/249.1; 427/521; 429/521

(58) Field of Classification Search ............. 427/249.1, 427/115, 229.1, 521; 429/521, 523, 486, 429/900, 901, 405, 535; 977/742, 948
See application file for complete search history.

(56) References Cited

U.S. PATENT DOCUMENTS

| | | | |
|---|---|---|---|
| 6,309,772 B1 * | 10/2001 | Zuber et al. ............ 429/483 |
| 2002/0006539 A1 * | 1/2002 | Kubota et al. ........... 429/44 |
| 2002/0049134 A1 | 4/2002 | Imazato | |

(Continued)

FOREIGN PATENT DOCUMENTS

JP    2002-110176    4/2002
(Continued)

OTHER PUBLICATIONS

Emmenegger et al., "Carbon nanotube synthesized on metallic substrates," *Applied Surface Science*, 162-63:452-456 (2000).

(Continued)

*Primary Examiner* — Michael Cleveland
*Assistant Examiner* — Tabassom T. Tadayyon-Eslami
(74) *Attorney, Agent, or Firm* — Finnegan, Henderson, Farabow, Garrett & Dunner, LLP (57) ABSTRACT

A fuel cell structure comprises a diffusion layer and/or a catalyst layer which are made of a carbonaceous porous material having a nano-size structure, such as carbon nanowall (CNW). A method of manufacturing the structure is also disclosed. The structure and method simplify the process of manufacturing a fuel cell electrode comprised of an electrode catalyst layer and a gas diffusion layer. The electrical conductivity of the catalyst layer is increased and the diffusion efficiency of the diffusion layer is improved, whereby the electricity generation efficiency of the fuel cell can be improved.

5 Claims, 7 Drawing Sheets

U.S. PATENT DOCUMENTS

| | | | |
|---|---|---|---|
| 2002/0136681 A1* | 9/2002 | Smalley et al. | 423/447.2 |
| 2003/0042226 A1* | 3/2003 | Coll et al. | 216/41 |
| 2004/0167014 A1* | 8/2004 | Yan et al. | 502/101 |
| 2004/0197638 A1* | 10/2004 | McElrath et al. | 429/44 |
| 2004/0224217 A1 | 11/2004 | Toops et al. | |
| 2005/0260473 A1* | 11/2005 | Wang | 429/33 |

FOREIGN PATENT DOCUMENTS

| | | |
|---|---|---|
| JP | 2002-298861 | 10/2002 |
| JP | 2004-059428 | 2/2004 |
| JP | 2004-362960 | 12/2004 |
| JP | 2005-004967 | 1/2005 |

OTHER PUBLICATIONS

Kuang et al., "Low temperature solvothermal synthesis of crumpled carbon nanosheets," *Carbon*, 42:1737-1741 (2004).

Wang et al., "Synthesis of carbon nanosheets by inductively coupled radio-frequency plasma enhanced chemical vapor deposition," *Carbon*, 42:2867-2872 (2004).

Supplementary European Search Report in European Patent Application No. 06714056.6-1227 dated Apr. 17, 2008.

Theodoridou E. et al., Controlled Spatial Distribution of Noble Metal Catalysts on Electrochemically Activated Carbon Fibre Supports, *Electrochimica Acta*, vol. 38, No. 6, pp. 793-798, 1993.

"Kougyou-zairyou" (Engineering Materials), vol. 52, No. 12, Dec. 1, 2004, Published by Nikkan-kougyou Shinbunsha, pp. 1-4.

* cited by examiner

Side view

Top view

FIG. 3

DIFFUSION LAYER

CATALYST LAYER

PROCESSED PORTION

FUEL CELL STRUCTURE AND METHOD OF MANUFACTURING SAME

TECHNICAL FIELD

The present invention relates to a polymer electrolyte fuel cell structure and a method of manufacturing the same whereby the manufacturing process can be simplified and the amount of catalytic precious metal can be reduced, which leads to a significant decrease in cost.

BACKGROUND ART

There are many types of fuel cell depending on the type of electrolyte used, such as polymer, phosphoric acid, solid oxide, molten carbonate, and alkaline. Among these, polymer electrolyte fuel cells have lower operating temperature and shorter startup time than other types of fuel cell. They are also easier to produce high output, expected to be reduced in size and weight, and resistant to vibration. For these reasons, the polymer electrolyte fuel cell is suitable as a power source for mobile objects.

Fuel cells generally employ a perfluorosulfonic acid membrane having a high proton conductivity. Examples of ion-exchange membrane currently used in polymer electrolyte fuel cells include perfluorocarbon sulfonic acid membranes such as Nafion (registered trademark) by DuPont, Flemion (registered trademark) by Asahi Glass Co., Ltd, Aciplex (registered trademark) by Asahi Kasei Corporation.

When such ion-exchange membrane is applied in a polymer electrolyte fuel cell, a membrane-electrode assembly is used which has a structure such that electrode catalyst layers having a fuel oxidizing capacity or an oxidant reducing capacity are disposed on both sides of the ion-exchange membrane, on the outside of which gas diffusion layers are further disposed.

Specifically, the structure includes an ion-exchange membrane consisting of a polymer electrolyte membrane that selectively transports hydrogen ion, on each side of which the electrode catalyst layer is formed. The electrode catalyst layer comprises, as a main component, a carbon powder supporting a platinum group metal catalyst. On the outer surface of the electrode catalyst layer, the gas diffusion layer, which has both a fuel gas permeability and electron conductivity, is formed. Generally, the gas diffusion layer consists of a substrate of carbon paper or carbon cloth on which a film of a paste containing a powder of fluorine resin, silicon, carbon or the like is formed. The aforementioned electrode catalyst layer and the gas diffusion layer are collectively referred to as an electrode.

In order to prevent the leakage of the supplied fuel gas and the mixing of the two kinds of fuel gas, a gas sealing member or a gasket is disposed around the electrode in such a manner as to sandwich the ion-exchange membrane. The gas sealing member, gasket, electrode, and ion-exchange membrane are assembled in an integrated manner beforehand, into what is called a membrane-electrode assembly (MEA).

On the outside of the MEA, an electrically conductive and airtight separator is disposed for mechanically fixing the assembly and electrically connecting adjacent MEAs to each other in series. A portion of the separator that is in contact with the MEA is formed with a gas channel for supplying a reaction gas to the electrode surface and to carry produced gas or excess gas away. While the gas channel can be provided separately from the separator, generally it is formed by providing a groove in the surface of the separator. Such structure consisting of the MEA fixed by means of a pair of the separators is used as a single cell, which is the basic unit.

By connecting a plurality of such single cells in series and arranging a manifold, which is a piping jig for the supply of fuel gas, a fuel cell is constructed.

Thus, manufacture of a polymer electrolyte fuel cell, particularly the electrode consisting of an electrode catalyst layer and a gas diffusion layer, requires complex process steps and technology. Furthermore, since the carbon powder supporting a platinum group metal catalyst does not necessarily have a large specific surface area, the amount of the supported platinum group metal catalyst is large, inevitably resulting in high cost.

In addition to causing the electrode catalyst layer (either a cathode catalyst layer or an anode catalyst layer) to retain a sufficient amount of catalyst particle for obtaining the catalytic function, electron conductivity is required between the electrode catalyst layer and the separator, which is a current collector, and proton conductivity is required between the electrode catalyst layer and the electrolyte membrane. Therefore, conventionally a catalyst layer on the order of several 10 g/m has been formed of a mixture of catalyst-supported conductive particle having a particle diameter on the order of 50 nm and proton conductor.

In the electrode catalyst layer of such structure, the electrons formed in the catalyst near the electrolyte membrane, for example, do not reach the current collector unless they move between a plurality of conductive particles. However, the area of contact between the conductive particles is small; in some cases, the electric resistance between the conductive particles is high because of the presence of the proton conductivity material between the particles. Thus, in the conventional catalyst layer, the electron conductivity between the current collector and the electrode catalyst layer is low, resulting in a decrease in the generating efficiency of the fuel cell.

The electron conductivity between the current collector and the electrode catalyst layer can be increased by increasing the density of the catalyst layer; however, increasing the density of the catalyst layer leads to a decrease in the dispersibility of fuel or oxidant into the catalyst layer, thereby making it impossible to fully exploit the catalytic function of the catalyst particle.

Concerning a technology related to the catalyst layer, it is reported in Electrochem. Acta., vol. 38, No. 6, p. 793 (1993) that carbon fiber was used as a catalyst carrier, where a catalyst particle was supported on the surface of the carbon fiber. However, if a carbon fiber that carries a catalyst particle is fabricated and the fiber is formed on the surface of the current collector to form an electrode which is used in a fuel cell, although the probability of the electrons generated near the electrolyte membrane moving between the particles (fibers) before they arrive at the current collector may become smaller, several times of transfers between the particles would be normally required, which will make it difficult to increase the electron conductivity sufficiently.

Thus, it has been difficult with the conventional electrodes for fuel cells to increase the electric conductivity of the catalyst layer to sufficient levels, and so it has been impossible to achieve a sufficiently high fuel cell generation efficiency. JP Patent Publication (Kokai) No. 2002-298861 A discloses an invention of an electrode for fuel cells, its object being the provision of a fuel cell having a high generation efficiency, a fuel cell electrode for realizing such fuel cell, and a method for manufacturing a fuel cell electrode achieving such fuel cell. This electrode comprises a current collector made of a conductive porous material, and a catalyst layer comprised of carbon nanofiber of which 50% or more of the tip portions has an angle of elevation of 45° or more with respect to the plane of the current collector, an electrode catalyst particle supported on the carbon nanofiber surface, and a proton conductor formed on the surface of the carbon nanofiber in contact with the electrode catalyst particle.

DISCLOSURE OF THE INVENTION

The above invention disclosed in JP Patent Publication (Kokai) No. 2002-298861 A makes it possible to simplify the process of manufacturing an electrode for fuel cells that is comprised of an electrode catalyst layer and a gas diffusion layer, and to improve the conductivity of the catalyst layer, whereby the fuel cell generation efficiency can be increased to some extent. However, the extent of improvement was not sufficient.

Thus, in view of the problems of the conventional art, it is an object of the invention to simplify the manufacturing process for an electrode for fuel cells comprising an electrode catalyst layer and a gas diffusion layer, to increase the electrical conductivity of the catalyst layer, to improve the diffusion efficiency of the diffusion layer, and thereby to improve the fuel cell generation efficiency.

The present invention is based on the inventors' realization that the aforementioned objects can be achieved by using a specific carbonaceous porous material having a vapor-grown nano-size structure as a diffusion layer and/or a catalyst layer of the fuel cell electrode.

Specifically, in a first aspect, the invention provides a fuel cell structure in which a carbonaceous porous material having a nano-size structure, such as carbon nanowall (CNW), is used as a diffusion layer and/or a catalyst layer. Carbon nanowall (CNW) is a carbonaceous porous material having a nano-size structure; its structure, method of manufacture, and so on will be described later.

In accordance with the invention, either the diffusion layer or the catalyst layer may be formed of a carbonaceous porous material having a nano-size structure, such as carbon nanowall (CNW). More preferably, both the diffusion layer and the catalyst layer are formed of a carbonaceous porous material having a nano-size structure, such as carbon nanowall (CNW).

In accordance with the invention, preferably a side-wall of the diffusion layer comprising the carbonaceous porous material having a nano-size structure, such as carbon nanowall (CNW), is provided with a gas-diffusing opening portion. By providing the gas-diffusing opening portion, gas diffusion can occur effectively.

In a second aspect, the invention provides a method of manufacturing a fuel cell structure. The method comprises the steps of: manufacturing a diffusion layer and a catalyst layer support by vapor-growing a carbonaceous porous material having a nano-size structure, such as carbon nanowall (CNW), on the surface of a separator and/or the surface of an electrolyte membrane; and distributing a catalyst component and an electrolyte in the catalyst layer support to manufacture a catalyst layer. This method can greatly simplify the process compared with conventional methods of manufacturing a fuel cell structure. Furthermore, since the carbonaceous porous material having a nano-size structure, such as carbon nanowall (CNW), has a large specific surface area, the amount of platinum-group precious metal catalyst that is used can be reduced.

In accordance with the invention, the method preferably comprises the step of providing a nano-size opening in a side-wall of the diffusion layer to form a gas-diffusing opening portion, simultaneously with or after the step of manufacturing the diffusion layer and the catalyst layer support by vapor-growing the carbonaceous porous material having a nano-size structure, such as carbon nanowall (CNW), on the surface of the separator and/or the surface of the electrolyte membrane. By providing such nano-size opening in the diffusion layer side-wall and providing the gas-diffusing opening portion, improved gas dispersibility can be obtained.

Preferable examples of the concrete method of forming the nano-size opening in the diffusion layer side-wall include plasma etching, FIB processing, laser processing, and oxidation treatment.

In the step of manufacturing the catalyst layer support by vapor-growing the carbonaceous porous material having a nano-size structure, such as carbon nanowall (CNW), on the surface of the electrolyte membrane, the catalyst component that is supported on the carbon nanowall (CNW) in each layer can be varied. In this way, the function of the carbon nanowall (CNW) can be adapted for individual layers, whereby precise catalyst layers can be fabricated.

In the present invention, the catalyst and the polymer electrolyte may be selected from a wide variety of known examples.

The fuel cell comprising the fuel cell structure of the invention may be either planar or cylindrical.

Examples of the carbonaceous porous material having a nano-size structure include graphite and amorphous, such as fullerene, carbon nanotube, carbon nanohom, and carbon nanoflake; in the invention, carbon nanowall is particularly preferable.

The carbon nanowall used in the present invention is a two-dimensional carbon nanostructure. Typically, it has a wall-like structure in which walls rise upward from the surface of a substrate in a substantially uniform direction. Fullerene (such as C60) is a zero-dimensional carbon nanostructure. Carbon nanotube can be considered to be a one-dimensional carbon nanostructure. Carbon nanoflake is an aggregate of planar, two-dimensional small pieces similar to carbon nanowalls; like the petals of the rose, the individual pieces are not mutually connected; it is a carbon nanostructure whose directionality with respect to the substrate is inferior to the carbon nanowall. Thus, the carbon nanowall is a carbon nanostructure having totally different characteristics from the fullerene, carbon nanotube, carbon nanohom, or carbon nanoflake.

By using the carbonaceous porous material having a nano-size structure, such as carbon nanowall, which is a carbon nanomaterial having a nanostructure whose microscopic structure, such as porosity, and whose macroscopic structure, such as pattern, can be freely changed, in the fuel cell structure, the catalyst layer and the diffusion layer can be integrally formed. As a result, (1) it becomes possible to manufacture an integrated cell structure by gaseous reaction through a series of operations, whereby the process of manufacturing a fuel cell structure can be greatly simplified and the manufacturing cost can be reduced; (2) gas dispersibility can be improved; (3) the contact resistance between the separator, which is a current collector, and the catalyst layer can be reduced; and (4) drainage of the diffusion layer can be improved, whereby flooding can be prevented. As a result, improved cell performance can be obtained.

BEST MODE OF CARRYING OUT THE INVENTION

A process for manufacturing carbon nanowall (CNW), which is most suitable as a carbonaceous porous material having a nano-size structure, is described below.

Figure 1:
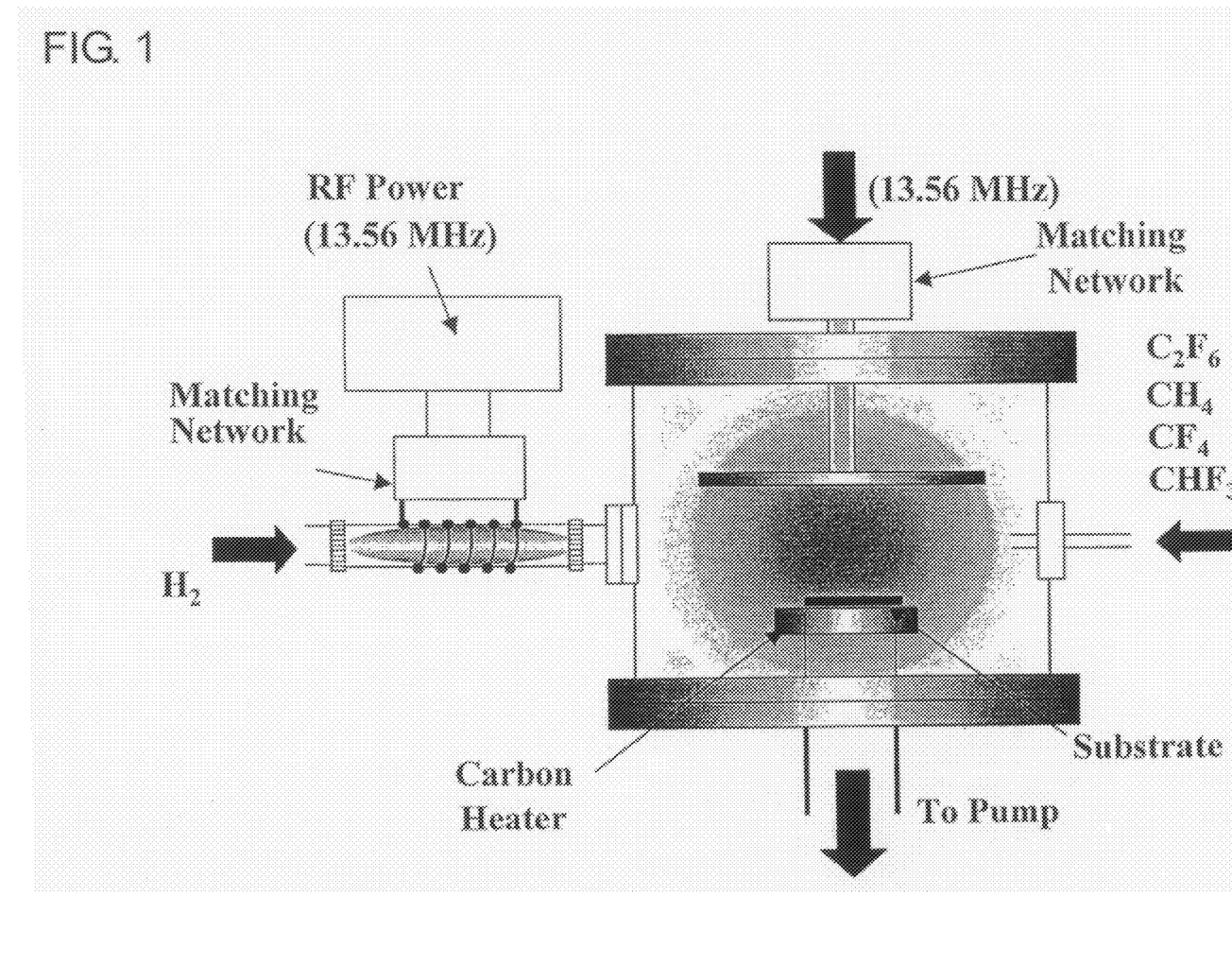
FIG. 1 schematically shows an apparatus for the manufacture of CNW.
Figure 2:
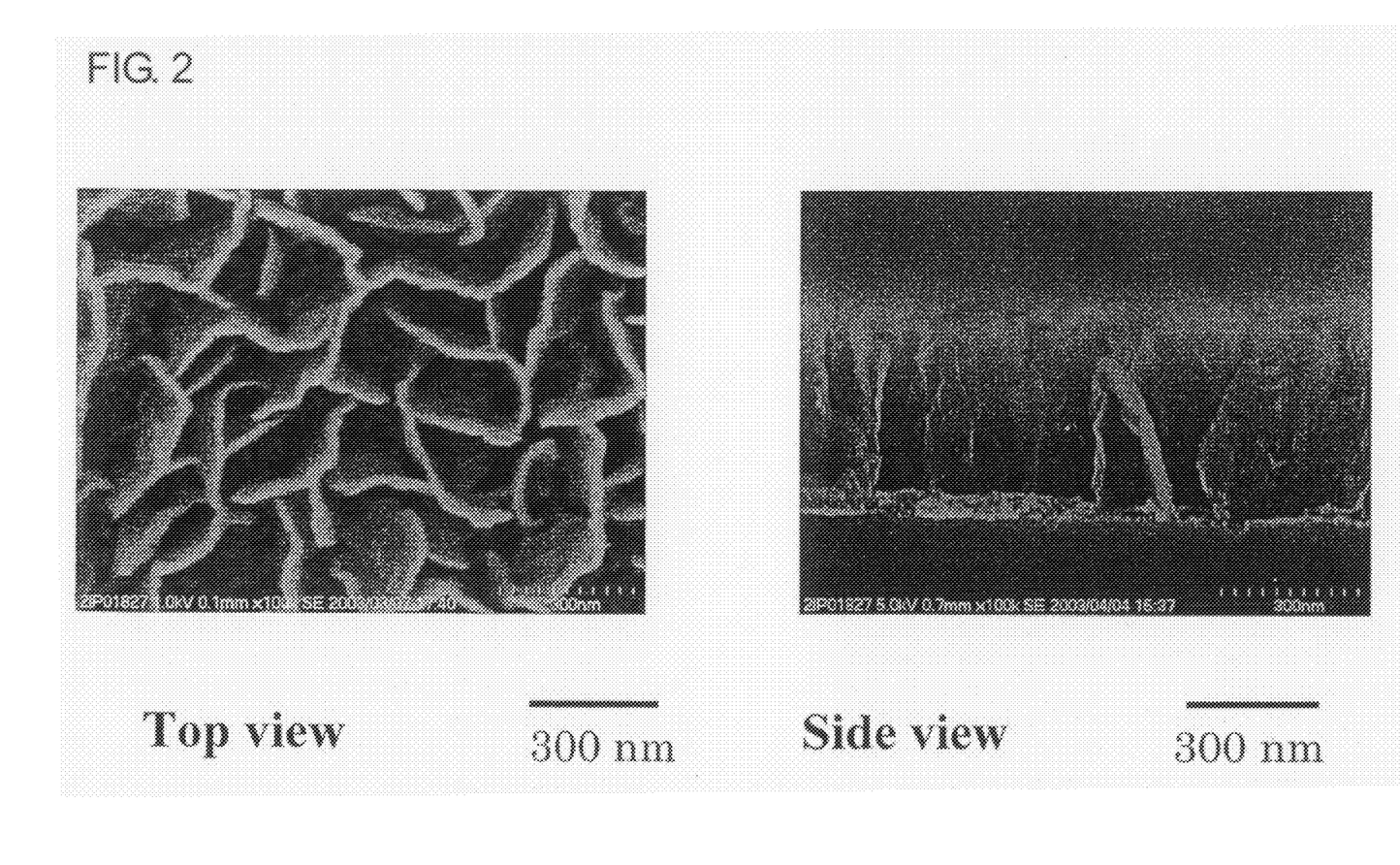
FIG. 2 schematically shows SEM images of fabricated CNW.

FIG. 1 schematically shows an apparatus for manufacturing CNW. FIG. 2 shows SEM images of CNW fabricated using the apparatus. With reference to FIG. 1, an H radical and a reaction gas containing carbon, such as $CF_4$, $C_2F_6$, or $CH_4$, are introduced between parallel plate electrodes in a chamber, and PECVD (plasma-enhanced chemical vapor deposition) is conducted. At this time, the substrate is preferably heated to about 500° C. The parallel plate electrodes are spaced apart from each other by 5 cm; between the plates, a capacitively coupled plasma is produced using an RF output apparatus of 13.56 MHz with an output of 100 W. The site of H radical growth is a quartz tube with length 200 mm and internal diameter 26 mm φ, into which $H_2$ gas is introduced to produce an inductively coupled plasma using the RF output apparatus of 13.56 MHz with output 400 W. The flow rates of the source gas and the $H_2$ gas are 15 sccm and 30 sccm, respectively, and the pressure inside the chamber is 100 mTorr. The height of the CNW (CNW film thickness) grown in this system for 8 hours is 1.4 μm; this, however, is merely an example, and these passages do not limit the experiment conditions, facility, or results.

In the following, the invention is described with reference to the drawings.

Figure 3:
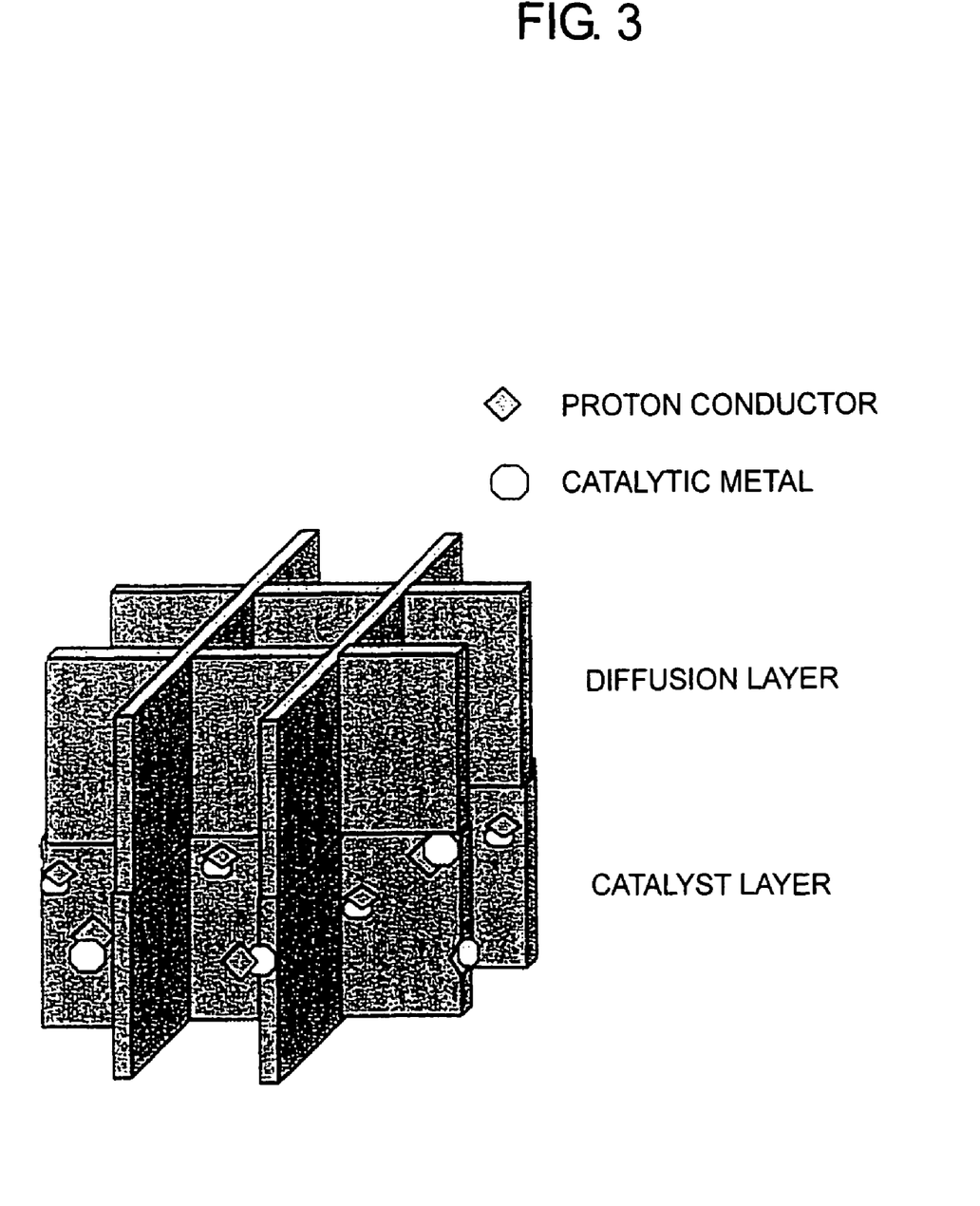
FIG. 3 schematically shows a structure of the invention.

FIG. 3 schematically shows a structure of the invention. The figure shows a catalyst layer by which a solid polymer membrane, not shown, is sandwiched, and a diffusion layer disposed on top thereof. In FIG. 3, a catalyst layer-diffusion layer integrated thin-film structure is shown in which both the catalyst layer and the diffusion layer are formed of carbon nanowall (CNW). On the side-wall of the carbon nanowall (CNW) of the catalyst layer, a catalyst metal and a proton conductor are supported.

Figure 4:
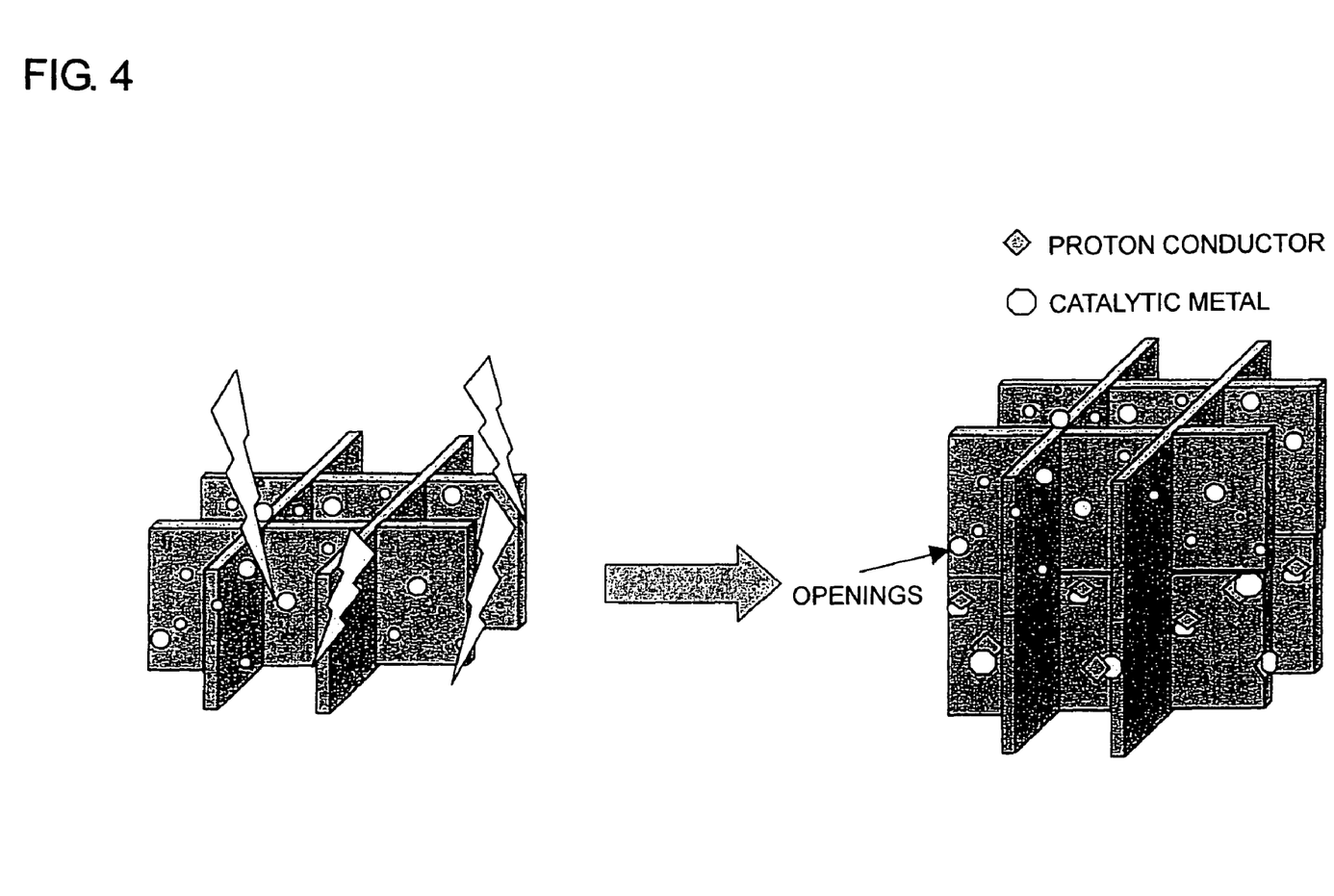
FIG. 4 schematically shows another structure of the invention.

FIG. 4 schematically shows another structure of the invention. FIG. 4 is similar to FIG. 3 in that the structure is a catalyst layer-diffusion layer integrated thin-film structure but differs from the structure of FIG. 3 in that nanometer-order openings are provided in the side-walls of the diffusion layer by plasma etching or FIB processing. By providing the diffusion layer side-walls with the nanometer-order openings, gas dispersibility can be improved.

Figure 5A:
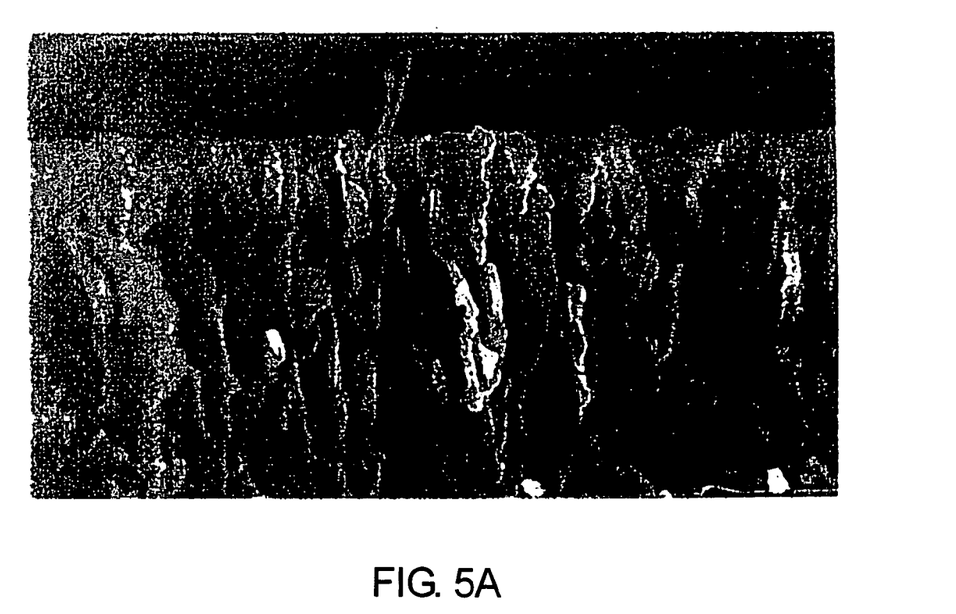
FIG. 5A shows an SEM image of the carbon nanowall (CNW) prior to FIB processing.
Figure 5B:
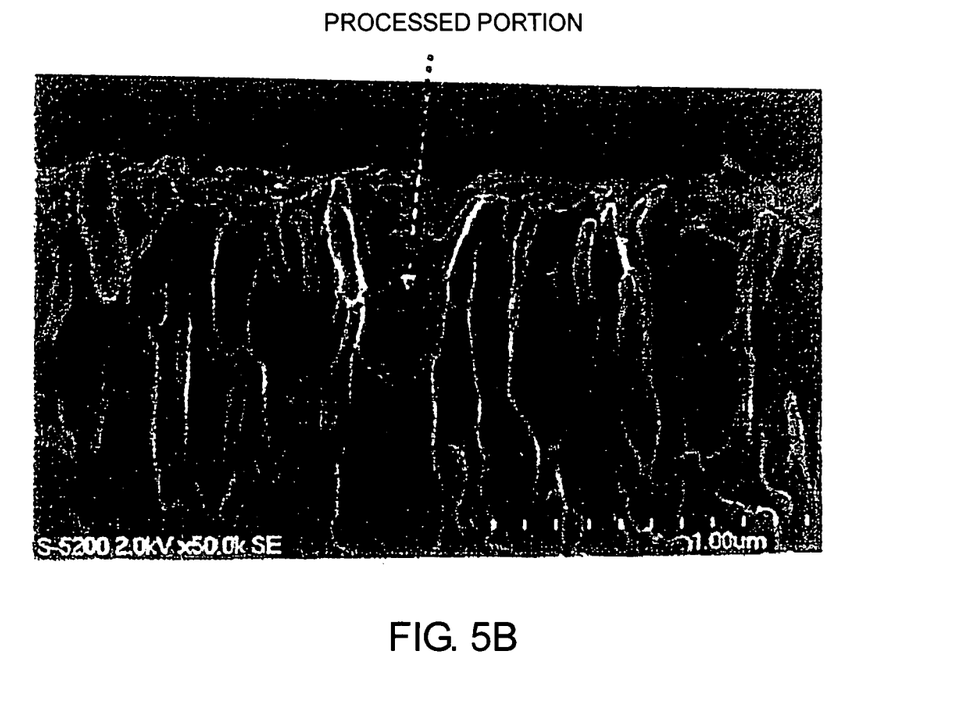
FIG. 5B shows an SEM image of the carbon nanowall (CNW) after FIB processing.

FIG. 5A shows an SEM image of carbon nanowall (CNW) prior to FIB processing; FIG. 5B shows an SEM image of carbon nanowall (CNW) after FIB processing. It can be seen that nanometer-order openings are provided in the side-walls of the carbon nanowall (CNW) by the FIB processing.

In the following, the invention is described with reference to examples; the invention, however, is not limited by any of the following examples.

EXAMPLE 1

Figure 6:
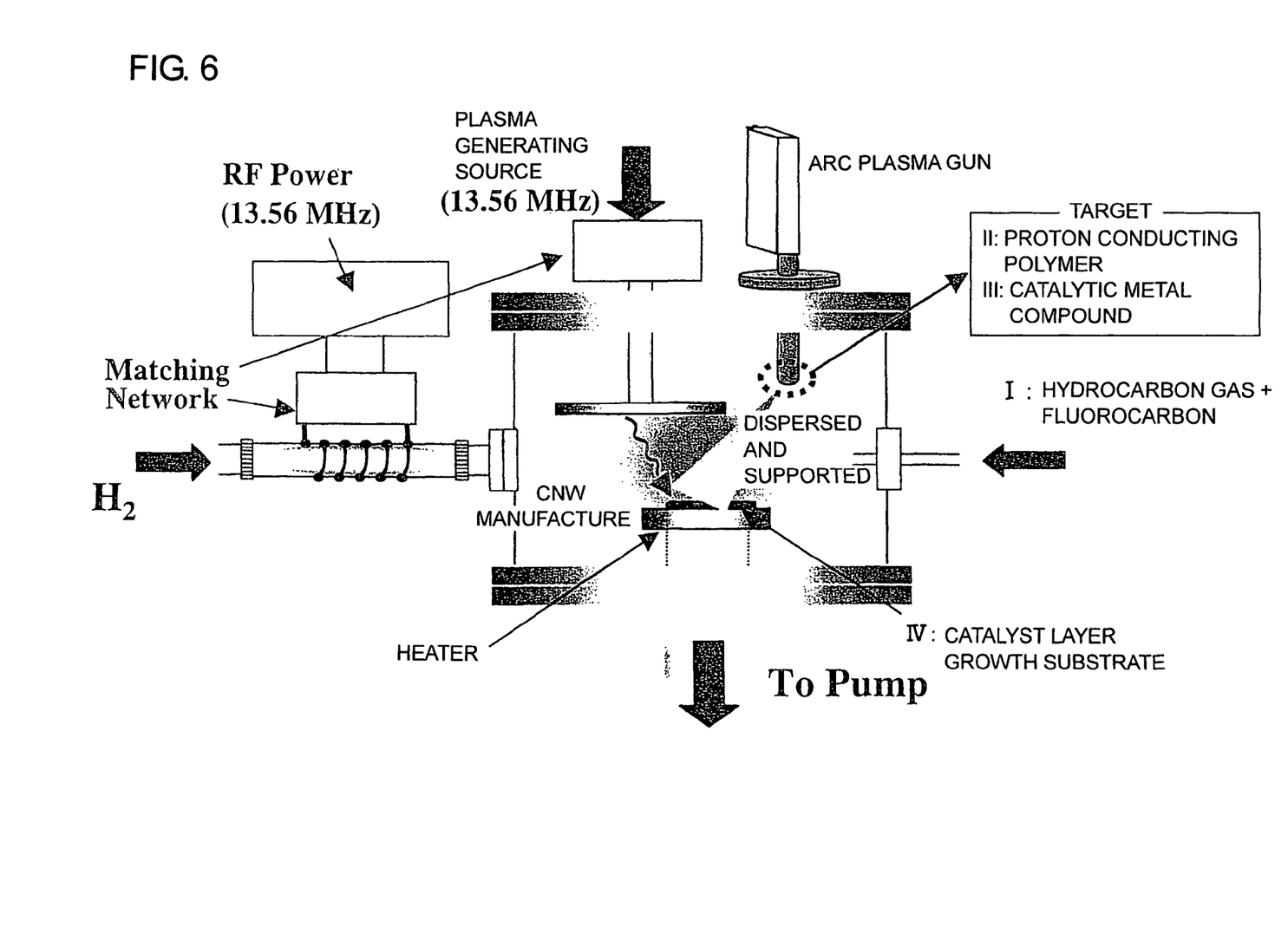
FIG. 6 shows an apparatus for the diffusion layer-catalyst layer one-step manufacturing method of the invention.

A process is described for manufacturing a diffusion layer-catalyst layer integrated thin-film using a diffusion layer-catalyst layer one-step manufacturing method shown in FIG. 6. In the present example, CNW is used for both the diffusion layer and the catalyst layer. First, using a plasma CVD apparatus shown in FIG. 6, CNW is manufactured on a separator as the diffusion layer. Thereafter, the manufacturing conditions are modified and CNW is manufactured, while at the same time the CNW surface is modified with a catalyst component and an electrolyte by means of laser, arc discharge, or plasma. In this way, a diffusion layer-catalyst layer integrated thin-film is completed. Conversely, it is also possible to manufacture a catalyst layer from the side of the electrolyte and to fabricate the diffusion layer finally. The proton conductor consists of a substance having a sulfonate group, phosphonate group, hydroxyl group, imidazole group, solid acid salt, tropolone, ionic liquid, or the like as a proton carrier. The catalyst material consists of: a group-8 metal, Cu, Ag, Au, or Ce; an organic metal compound of two or more of such substances; a metal salt or a metal of such substances; or a mixture thereof. These catalyst materials are merely examples, and other catalyst materials known in the art of fuel cell may be used.

EXAMPLE 2

Figure 7:
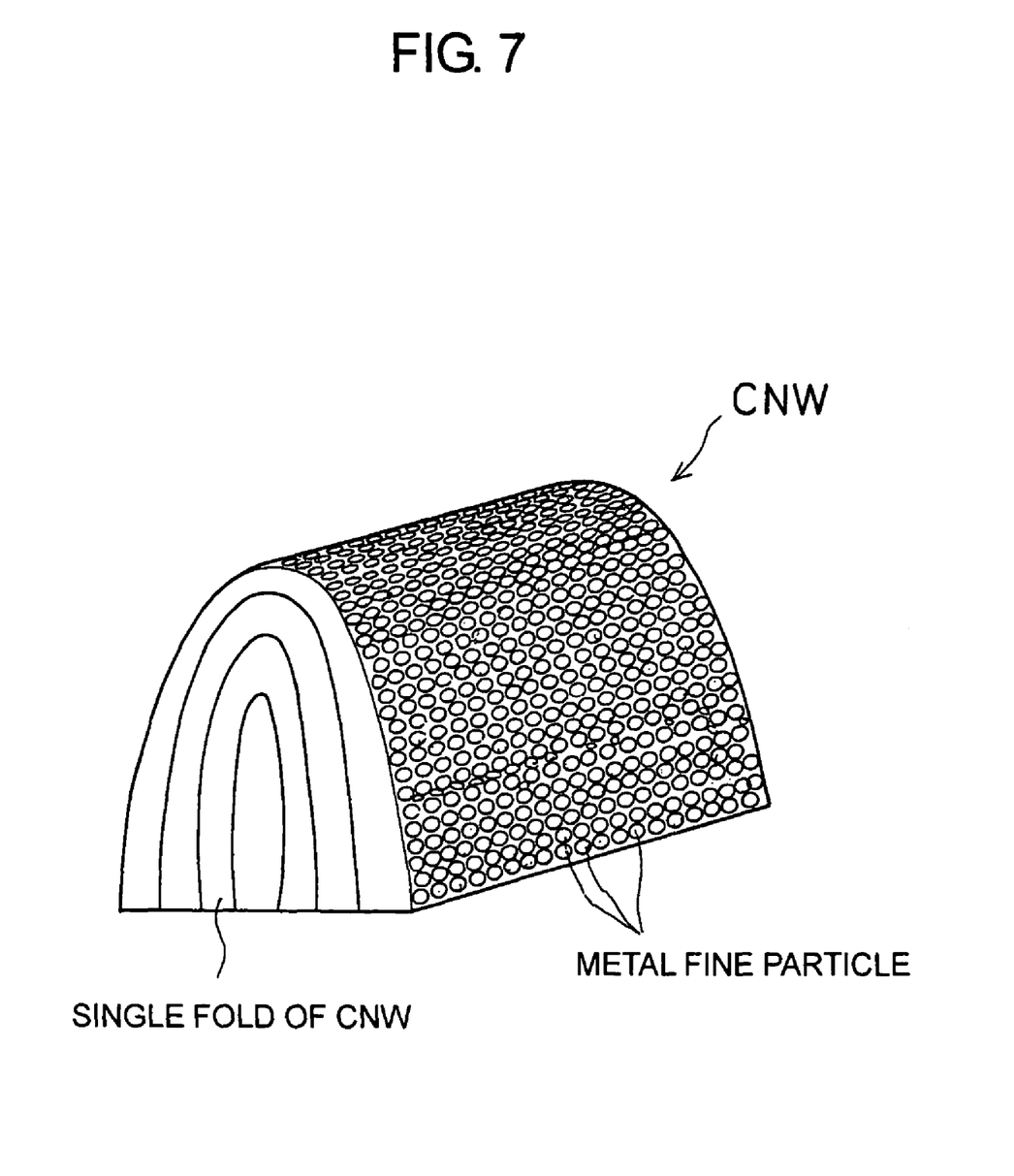
FIG. 7 illustrates an example of the method of providing openings by plasma etching.

FIG. 7 shows an example of a method of providing openings by plasma etching. In this method, metal nanoparticles are deposited on the surface of CNW by means of arc discharge or plasma discharge, for example. The amount of deposit in this case is such that the CNW is visible. Thereafter, the CNW alone is etched, thereby providing nano-size through-holes. For example, by exposing the CNW of FIG. 7 in oxygen plasma, etching only proceeds in the portions of the gaps between the metal fine particles, so that through-holes are provided at those portions.

In accordance with Examples 1 and 2, the following advantages can be obtained: (1) since the diffusion layer-catalyst layer integrated thin-film can be formed at once in the same chamber, the number of steps can be reduced and therefore cost can be reduced; and (2) since the diffusion layer-catalyst layer is continuously formed, there is no contact resistance, whereby electricity generation loss in the fuel cell can be reduced.

INDUSTRIAL APPLICABILITY

In accordance with the invention, the use of a carbonaceous porous material having a nano-size structure, such as carbon nanowall, in the fuel cell structure allows the catalyst layer and the diffusion layer to be integrally formed. As a result, (1) it becomes possible to manufacture an integrated cell structure in a series of operations by gaseous reaction, whereby the fuel cell structure manufacturing process can be greatly simplified, thereby contributing to a decrease in manufacturing cost; (2) improved gas dispersibility can be obtained; (3) the contact resistance between the separator, which is a current collector, and the catalyst layer can be reduced; and (4) drainage of the diffusion layer can be improved, thereby preventing flooding. As a result, improved cell performance can be obtained. Thus, the invention contributes to the wide use of fuel cells.

The invention claimed is:

1. A method of manufacturing a fuel cell structure, comprising:

forming both a diffusion layer and a catalyst layer support by vapor-growing a carbonaceous porous material having a nano-size structure, wherein the diffusion layer is disposed on the surface of a separator and/or the catalyst layer support is disposed on the surface of an electrolyte membrane; and dispersing a catalyst component and an electrolyte in the catalyst layer support to define a catalyst layer, wherein the carbonaceous porous material having a nano-size structure comprises carbon nanowall (CNW), wherein the CNW comprises a two-dimensional carbon nanostructure having a wall-like structure in which walls rise upward from the surface of the separator and/or the catalyst layer in a substantially uniform direction.

2. The method of manufacturing a fuel cell structure according to claim 1, further comprising providing a nano-size opening in a side-wall of the diffusion layer to form a gas-diffusing opening portion, simultaneously with or after the formation of the diffusion layer and the catalyst layer support.

3. The method of manufacturing a fuel cell structure according to claim 2, wherein said providing a nano-size opening in the side-wall of the diffusion layer comprises plasma etching, FIB processing, laser processing, or oxidization treatment.

4. The method of manufacturing a fuel cell structure according to claim 1, further comprising providing gas-diffusing nano-size through-holes in a side-wall of the diffusion layer after the formation of the diffusion layer.

5. The method of manufacturing a fuel cell structure according to claim 4, wherein said providing gas-diffusing nano-size through-holes in the side-wall of the diffusion layer comprises plasma etching, FIB processing, laser processing, or oxidization treatment.

* * * * *